March 18, 1924.
J. G. ESTERS
1,487,548
COMBINED AUTOMOBILE TAIL LIGHT AND LICENSE PLATE ILLUMINATOR
Filed Feb. 9, 1923
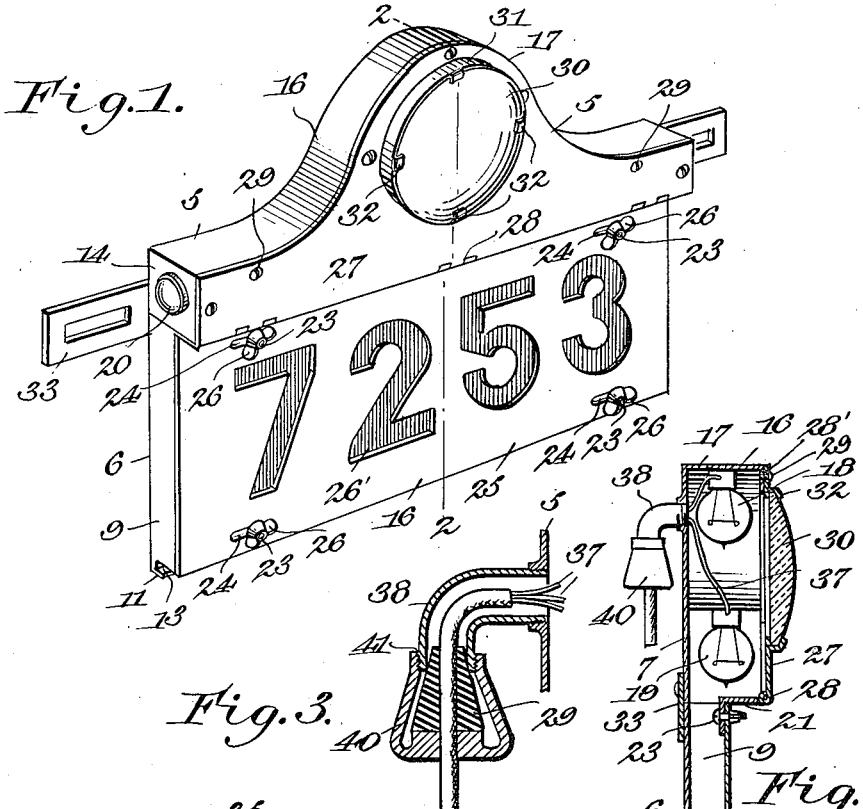
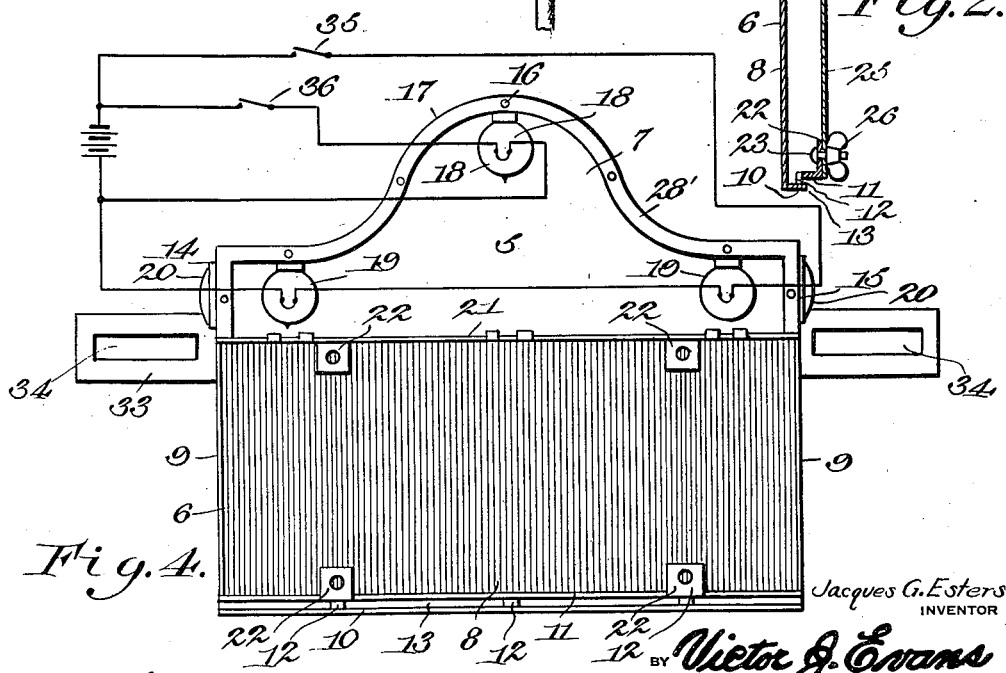

Patented Mar. 18, 1924.

1,487,548

UNITED STATES PATENT OFFICE.

JACQUES G. ESTERS, OF BROOKLYN, NEW YORK.

COMBINED AUTOMOBILE TAIL LIGHT AND LICENSE-PLATE ILLUMINATOR.

Application filed February 9, 1923. Serial No. 618,076.

*To all whom it may concern:*

Be it known that I, JACQUES G. ESTERS, a citizen of United States, residing at Brooklyn, in the county of Kings and State of New York, have invented new and useful Improvements in Combined Automobile Tail Lights and License-Plate Illuminators, of which the following is a specification.
This invention relates to a combined automobile tail light and license plate illuminator and has for its primary object the provision of means for properly illuminating the license number and for simultaneously displaying the customary or regulation tail light.

In devices of this character, it has been found that where the license number or required indicia is printed upon a plate, transparent glass or the like, the same is soon obliterated by the accumulation thereon of dust, grease or foreign matter, rendering it exceedingly difficult to properly distinguish or identify said number or indicia.
It is also common practice among thieves when stealing an automobile to purposely obliterate the license number with grease, dust or other matter so that in making away with the car, it is impossible for one to recognize such number when the car is proceeding along a public thoroughfare.

It is therefore an important object of my invention to provide a license plate wherein means are employed to render same self cleaning and to provide means satisfactorily serving to prevent carrying out of the heretofore practice of obliterating the license number or indicia through the acts aforesaid.
Another object of the invention is to provide a device of this character wherein the number bearing surface of the license plate is self cleaning through the action of an induced air draft, which causes the draft of air to constantly pass over the plate when the automobile is propelled and thereby relieve the plate of dust or like sediment to cause it to be clearly visible.

Another object of the invention is to provide a license plate whose number will be clearly visible in day time, as well as at night.

Another object of the invention is to provide a system of illuminating the license plate so that all portions thereof are distinctly visible.

A still further object of the invention is to provide a device of this character which will satisfactorily accommodate itself to well-known forms of license plates of the type customarily provided by the laws of municipalities, without requiring changes in the construction of such plates.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 1 is a perspective view of the device.

Figure 2 is a vertical section therethrough taken approximately on line 2—2 of Figure 1.

Figure 3 is a detail vertical sectional view.

Figure 4 is a front view of the device with the license plate and tail light lens carrying member removed.

In carrying the invention into practice, I employ a receptacle structure consisting of upper and lower sections 5 and 6, the former having a flat wall 7 which is arranged in the same general plane with a flat wall 8 of the section 6. The section 6 is bounded at its sides by walls 9—9 and at its bottom by walls 10 and 11, the former having upstruck spacing lips 12 which may be permanently or otherwise suitably secured to the wall 10 so as to hold the latter and aforesaid wall 11 spaced apart. In this manner the two walls 10 and 11 constitute a draft duct 13 for a purpose to be hereinafter explained. The inner edge of the wall 11 is spaced from the flat wall 8 of the section 6.

The upper section 5 is bounded by end walls 14 and 15 and a top wall 16, the latter being arched at its center as at 17 and provided with an electric lamp 18. The terminals of the wall 16, adjacent to the end walls 14 and 15 are provided with electric lamps 19. The said end walls 14 and 15 are provided with red lenses 20 which constitute warning signals to be exposed from the sides of the car. Connecting the walls 14 and 15 is a wall or bar 21 which is spaced at its inner edge from the wall 7 as shown. This provides a light space between the walls 7 and said bar 21 so that rays of light from the lamps 18 and 19 will be scattered uniformly in a downward direction against the wall 8.

The wall 7 and the inner surfaces of the walls 14, 15 and 16 are preferably enameled white so as to constitute a reflecting surface. The inner surface of the wall 8 and the inner surface of the walls 9—9 are preferably covered with a very brilliant red enamel which will be clearly discernible either by night or day.

The wall 21 and said wall 11 have secured thereto bracket plates 22 which carry studs or bolts 23 adapted to be extended from slots 24 in the license plate 25. The bracket plates 22 are proportioned with respect to the sizes of the slots 24 so that the slots at the sides of the bolts 23 will be closed against the passage of light rays therefrom. The studs or bolts 23 are equipped with winged nuts 26 which act to firmly secure plate 25 in an applied position.

The license plate 25 has its license number 26' stenciled thereon whereby the red foundation of the wall 8 is clearly visible therethrough.

The upper section 5 is provided with a member 27 hinged at 28 to the wall or bar 21. This member is adapted to co-act with flanged portions 28 upon walls 14, 15 and 16 and to be secured thereto by suitable screws or the like 29. The member 27 is provided with a red tail light lens 30 arranged in a metal mounting 31 having bendable clips 32 upset on one side of the member 27. The red lenses in the walls 14 and 15 can be arranged in similar metal mountings. The lens 30 is at the center of the member 27 so that the lamp 18 falls directly behind same. By providing the lamps 18 and 19, 19 which are spaced apart as described, the side lenses in the walls 14 and 15 are clearly illuminated, likewise the lens 30 and at the same time light rays from these lamps are uniformly distributed in a downward direction on to the signalling surface of the wall 8 so that a brilliant red reflection from the wall 8 may be seen through the stenciled license number.

The section 5 of the device is provided with an attaching bracket 33 slotted at its ends at 34 for attachment to the car. This bracket extends across the back of the device and connects the flat walls 7 and 8. It will be understood that the walls 7 and 8 may be integral with each other and the casing stamped from a single piece of material.

From the construction described it is obvious, particularly when the automobile is travelling that a back draft air will be made to cycle through the numbers of the license plate and through the duct 13 at the base of a section 6. Incident thereto the colored signalling surface of the wall 8 is made self cleaning likewise the numbers of the plate so as to permit these numbers to be clear under all conditions. By stenciling the numbers upon the license plate and spacing this plate from the wall 8 it is very difficult for one to obliterate these numbers with grease, dust or other foreign matter and in consequence thereof the license number is always visible or legible.

Switches 35 and 36 are provided to control the lamps 18 and 19, 19. The switch 35 operates the two end lamps 19, 19 so that when the car is parked these lamps can be extinguished and only the tail lamp left burning. When the car is travelling upon a highway the switches 35 and 36 are controlled so that all of the lamps are kept burning. The feed wires 37 of the lamps 18 and 19 pass through an elbow 38 at the back of the section 5. This elbow is provided with a wire carrying plug 39 which is flared to snugly fit inside one leg of the elbow. Coacting with this leg of the elbow is a clamping cap 40, preferably threaded thereon at 41. While I have described what I deem to be the most desirable embodiment of my invention, I do not wish to limit myself to the exact details of construction herein set forth nor to anything less than the whole of my invention limited only by the appended claims.

What I claim as new is:—

1. A device of the class described comprising a casing, an opening in the bottom of said casing extending the length thereof, a colored back wall formed in said casing, a license plate removably supported by said casing in spaced relation to said colored back wall, cut-out indicia upon said license plate for co-action with the opening in said casing whereby to cause a draft of air to circulate through said opening and said cut-out indicia to automatically clean said colored back wall when a vehicle is in motion.

2. A device of the class described comprising a casing, an opening in the bottom of said casing extending the length thereof, a colored back wall formed in said casing, a license plate removably supported by said casing in spaced relation to said colored back wall, cut-out indicia upon said license plate for co-action with the opening in said casing whereby to cause a draft of air to circulate through said opening and said cut-out indicia to automatically clean said colored back wall when a vehicle is in motion, and means for illuminating said colored wall including lamps arranged above the same.

3. A device of the class described comprising a casing having a colored rear wall, a license plate constituting the front wall of said casing and spaced from said rear wall, cut-out license indicia formed in said license plate, an opening formed in the lower end of said casing whereby a draft of air is adapted to pass through said cut-out indicia and out of said opening to prevent the accumulation of dust on said colored rear wall.

4. A device of the class described comprising a casing having a colored rear wall, a license plate constituting the front wall, of said casing and spaced from said rear wall, cut-out license indicia formed in said license plate, an opening formed in the lower end of said casing whereby a draft of air is adapted to pass through said cut-out indicia and out of said opening to prevent the accumulation of dust on said colored rear wall, and means for illuminating said colored rear wall to cast a light through said cut-out indicia.

5. A device of the class described comprising a casing having spaced bottom walls to provide an air duct and a colored rear wall, a license plate, means for attaching said license plate to said casing and in spaced relation to said colored rear wall, cut-out license indicia in said license plate whereby draft of air is adapted to pass through said cut-out indicia and said duct to prevent the accumulation of dust on said colored rear wall.

6. A device of the class described comprising a casing having spaced bottom walls to provide an air duct and a colored rear wall, a license plate, means for attaching said license plate to said casing and in spaced relation to said colored rear wall, cut-out license indicia in said license plate whereby draft of air is adapted to pass through said cut-out indicia and said duct to prevent the accumulation of dust on said colored rear wall, in combination with a light chamber mounted above said colored rear wall, and means for illuminating said light chamber to reflect a beam of light to said colored rear wall substantially as and for the purpose specified.

In testimony whereof I have affixed my signature.

JACQUES G. ESTERS.